United States Patent [19]
Sprenger

[11] 3,911,007
[45] Oct. 7, 1975

[54] N-SUBSTITUTED N-BENZYLOXY-2-METHYL-2-(4-HALOPHENOXY)PROPIONAMIDES

[75] Inventor: William K. Sprenger, Arlington Heights, Ill.

[73] Assignee: G. D. Searle & Co., Chicago, Ill.

[22] Filed: Aug. 8, 1974

[21] Appl. No.: 495,859

[52] U.S. Cl. .................... 260/559 B; 260/562 A
[51] Int. Cl.² ........................................ C07C 103/32
[58] Field of Search .................... 260/559 B, 562 A

[56] References Cited
UNITED STATES PATENTS

| | | | |
|---|---|---|---|
| 3,634,511 | 1/1972 | Howe et al. | 260/559 B |
| 3,723,524 | 3/1973 | Augstein et al. | 260/559 A |

FOREIGN PATENTS OR APPLICATIONS

| | | | |
|---|---|---|---|
| 2,062,055 | 6/1971 | Germany | 260/562 A |

*Primary Examiner*—C. Davis
*Attorney, Agent, or Firm*—John J. McDonnell

[57] ABSTRACT

This invention is concerned with N-substituted-N-benzyloxy-2-methyl-2-(4-halophenoxy)propionamides of the following structure

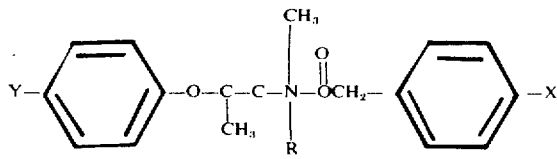

wherein X is hydrogen, halo, (lower alkoxy) containing 1–7 carbon atoms, or phenyl; Y is halo; and R is hydrogen, (lower alkoxy)carbonyl, (lower alkanoyl) containing 1–7 carbon atoms or aroyl. These compounds are prepared by condensing 2-(4-halophenoxy)-2-methylpropionyl chlorides with an appropriate benzyloxyamine to provide N-benzyloxy-2-methyl-2-(4-halophenyl)propionamides in which R is hydrogen. The compounds wherein R is lower alkanoyl or aroyl are prepared by reacting N-benzyloxy-2-methyl-2-(4-halophenyl)propionamide with a (lower alkanoyl) or aroyl chloride. These compounds are useful as antilipemic agents and also have antifungal utility.

9 Claims, No Drawings

N-SUBSTITUTED N-BENZYLOXY-2-METHYL-2-(4-HALOPHENOXY)PROPIONAMIDES

The present invention encompasses compounds of the formula

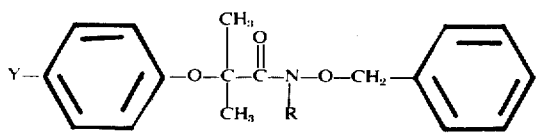

wherein X is hydrogen, (lower alkoxy) containing 1–7 carbon atoms, halo, or phenyl; Y is halo; and R is hydrogen, (lower alkoxy)carbonyl, (lower alkanoyl) containing 1–7 carbon atoms or aroyl, preferably benzoyl.

Most preferred embodiments of this invention are those in which R is hydrogen, Y is chloro, and X is hydrogen, (lower alkoxy), halo or phenyl. Specifically, N-benzyloxy-2-methy-2-(4-chlorophenoxy)propionamide, N-4-chlorobenzyloxy-2-methyl-2-(4-chlorophenoxy)propionamide, N-4-methoxybenzyloxy-2-methyl-2-(4-chlorophenoxy)propionamide, and N-4-phenylbenzyloxy-2-methyl-2-(4-chlorophenoxy)propionamide are preferred.

The preferred embodiment of this invention when R is alkoxycarbonyl is N-ethoxycarbonyl-N-benzyloxy-2-methyl-2-(4-chlorophenoxy)propionamide.

The preferred embodiment of this invention when R is alkanoyl is N-acetyl-N-benzyloxy-2-methyl-2-(4-chlorophenoxy)propionamide.

The preferred embodiment of this invention when R is aroyl is N-benzoyl-N-benzyloxy-2-methyl-2-(4-chlorophenoxy)propionamide. Compounds of this invention are prepared as set out in Scheme 1.

chlorophenoxy)-2-methylpropionyl chloride. 8.2 Parts of this chloride is reacted with 5.6 parts of benzyloxyalamine hydrochloride in 70 parts of 1.0N sodium hydroxide solution to provide N-benzyloxy-2-methyl-2-(4-chlorophenoxy)propionamide. 2-(4-Methoxyphenoxy)-2-methylpropionoxamic acid is described in Japanese patent application no. 7039246 (Feb. 2, 1970) but the compounds of the present invention differ in structure in that they have a 2-(4-chlorophenoxy) instead of a 2-(4-methoxyphenoxy) radical and a benzyloxy instead of hydroxy radical. N-methoxy 3-(4-chlorophenoxy)-3-methylpropionamide is described in U.S. Pat. No. 3,625,950 (Dec. 7, 1971), but the compounds of the present invention differ structurally in that they have an N-benzyloxy radical as well as other structural distinctions.

The compounds of this invention are useful as antifungal agents and they have hypolipenic activity. The anti-fungal activity of these compounds is exemplified by their activity against *Trichophyton mentagrophytes* as determined by tests described in U.S. Pat. No. 3,682,951, Column 3, lines 62–67 and Column 4, lines 1–25.

The hypolipemic utility of the instant compounds is demonstrated by the following standardized test for their capacity to lower both serum cholesterol and serum triglycerides in rats. Charles River CD rats weighing 400–450 gm. apiece and maintained on tap water ad libitum are used in this test. To each of a group (Group I) of 8 such animals is administered in the powdered diet 0.2% of compound. The compound is incorporated by dissolving it in acetone or other volatile solvent and mixing the solution with the diet, whereupon the solvent is allowed to evaporate at room temperatures. The animals are fed the treated diet for 5 days. On the 6th day, serum samples are obtained and

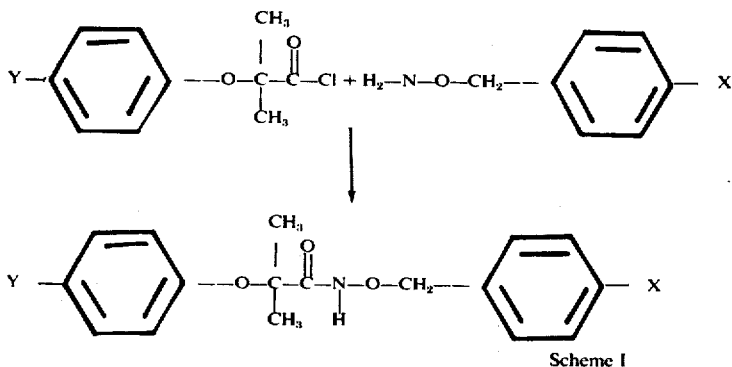

Scheme 1

The hydrogen attached to the nitrogen may be replaced by reacting an alkanoyl halide such as acetyl chloride, an aroyl halide such as benzoyl chloride, or an alkoxycarbonyl halide such as ethyl chloroformate.

According to Scheme 1, 2-(4-halophenoxy)-2-methylpropionyl chloride is reacted with benzyloxyamine to provide N-benzyloxy-2-(4-halophenoxy)-2-methylpropionamide.

Thus, 53 parts of 2-(4-chlorophenoxy)-2-methylpropionic acid (U.S. Pat. No. 3,625,950) is reacted with 60 parts of thionyl chloride to provide 2-(4- are analyzed for cholesterol and triglycerides. Cholesterol is analyzed by the method of Block et al., Automation in Analytical Chemistry, Technico Symposium, 1965, Mediad Incorporated, White Plaines, N.Y. 10601, pp. 345 ff.; and the triglycerides are assayed by the procedure of Noble and Campbell, *Clin. Chem.*, 16, 166 (1970). Controls are provided by a second group (Group II) of 8 animals each concurrently and identically treated except that in Group II the compound is omitted from the diet. A compound is considered hypolipemic if the mean mg. % serum cholesterol and triglyceride values of Group I are significantly lower than for Group II. The level of significance in each instance is P<0.05 as determined by the Wilcoxon Rank Sum method.

The following examples are presented to further illustrate the present invention. They should not be construed as limiting it either in spirit or in scope. In these examples quantities are indicated in parts by weight unless parts by volume are specified, and temperatures are indicated in degrees Centigrade (°C.). The relationship between parts by weight and parts by volume is the same as that existing between grams and milliliters.

EXAMPLE 1

53 Parts of 2-(4-chlorophenoxy)-2-methylpropionic acid (U.S. Pat. No. 3,625,950) is reacted with 60 parts of thionyl chloride to provide 2-(4-chlorophenoxy)-2-methylpropionyl chloride. To a cold solution of 70 parts of 1.0N sodium hydroxide solution containing 5.6 parts of benzyloxyamine hydrochloride is added slowly 8.2 parts of 2-(4-chlorophenoxy)-2-methylpropionyl chloride. The reaction mixture is stirred for 2 hours and the solid which forms is separated and recrystallized from hexane to provide N-benzyloxy-2-methyl-2-(4-chlorophenoxy)propionamide, melting at 59°-60°. This compound has the following structural formula

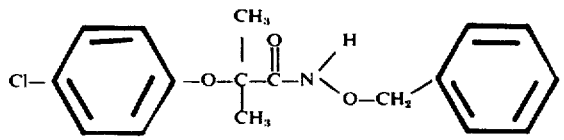

EXAMPLE 2

Following the procedure in Example 1, 7.0 parts of 2-(4-chlorophenoxy)-2-methylpropionyl chloride is reacted with 6.4 parts of 4-chlorobenzyloxyamine in 63 parts of 1.0N sodium hydroxide solution to provide N-4-chlorobenzyloxy-2-methyl-2-(4-chlorophenoxy)propionamide, melting at 80°-81°. This compound has the following formula

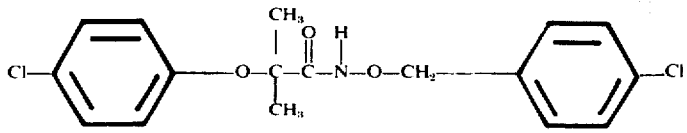

EXAMPLE 3

Following the procedure set out in Example 1, 7.0 parts of 2-(4-chlorophenoxy)-2-methylpropionyl chloride is reacted with 6.3 parts of 4-methoxybenzyloxyamine in 63 parts of 1.0N sodium hydroxide solution to provide N-4-methoxybenzyloxy-2-methyl-2-(4-chlorophenoxy)propionamide, melting at 78°-79°. This compound has the following structural formula

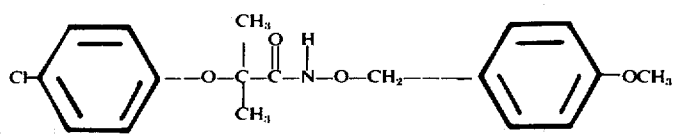

EXAMPLE 4

The following procedure set out in Example 1, 7.0 parts of 2-(4-chlorophenoxy)-2-methylpropionyl chloride is reacted with 7.8 parts of 4-phenylbenzyloxyamine in 63 parts of 1.0N sodium hydroxide solution to provide N-4-phenylbenzyloxy-2-methyl-2-(4-chlorophenoxy)propionamide, melting at 91°-93°. This compound has the following formula

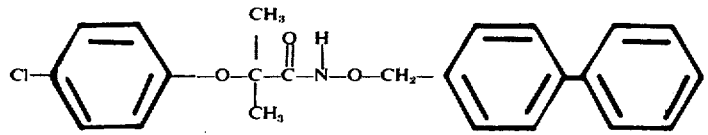

EXAMPLE 5

Following the procedure set out in Example 1, 7.1 parts of 2-(4-chlorophenoxy)-2-methylpropionyl chloride is reacted with 6.4 parts of 4-bromobenzyloxyamine solution in 63 parts of 1.0N sodium hydroxide solution to provide N-4-bromobenzyloxy-2-methyl-2-(4-bromophenoxy)propionamide. This compound is represented by the following formula

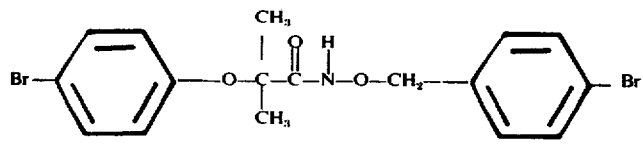

EXAMPLE 6

To a solution of 6.4 parts of N-benzyloxy-2-methyl-2-(4-chlorophenoxy)propionamide and 2.5 parts of triethylamine in 43.2 parts of methylene chloride at 0°C. is added 2.0 parts of acetyl chloride. The reaction mixture is stirred for 30 minutes and allowed to warm to room temperature and washed with ice water. The methylene chloride layer is dried over anhydrous sodium sulfate and the solvent is removed. The crude product is chromatographed on a silica gel column and eluted with benzene: 5% ethyl acetate solution. This procedure provided a fraction, which is N-acetyl-N-benzyloxy-2-methyl-2-(4-chlorophenoxy)propionamide, melting at 58°-62°. This compound has the following structural formula

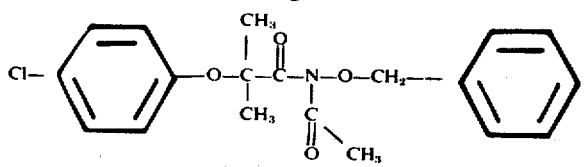

EXAMPLE 7

Following the procedures set out in Example 6, 8.0 parts of N-benzyloxy-2-methyl-2-(4-chlorophenoxy)-propionamide and 2.5 parts of triethylamine in 63 parts of methylene chloride are reacted with 2.7 parts of ethyl chloroformate to provide N-ethoxycarbonyl-N-benzyloxy-2-methyl-2-(4-chlorophenoxy)propionamide. This compound has the following structural formula

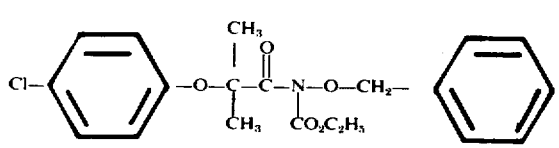

EXAMPLE 8

Following the procedures set out in Example 6, 6.4 parts of N-benzyloxy-2-methyl-2-(4-chlorophenoxy)-propionamide and 4.0 parts of pyridine are allowed to react with 32 parts of benzoyl chloride, thus providing N-benzoyl-N-benzyloxy-2-methyl-2-(4-chlorophenoxy)propionamide. This compound has the following structural formula

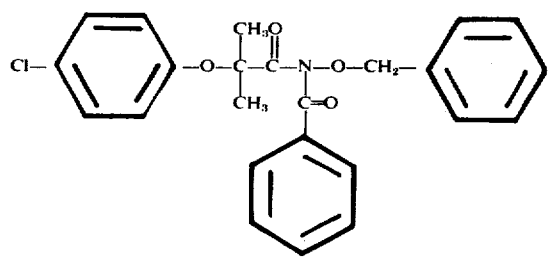

EXAMPLE 9

Following the procedures set out in Example 6, 8.0 parts of N-benzyloxy-2-methyl-2-(4-chlorophenoxy)-propionamide and 2.5 parts of triethylamine in 63 parts of methylene chloride are reacted with 2.7 parts of methyl chloroformate to provide N-methoxycarbonyl-N-benzyloxy-2-methyl-2-(4-chlorophenoxy)propionamide. This compound has the following structural formula

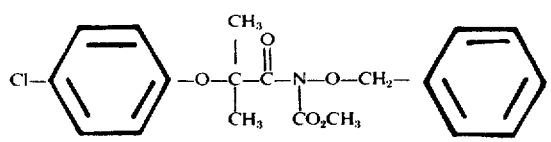

EXAMPLE 10

To a solution of 6.4 parts of N-benzyloxy-2-methyl-2-(4-chlorophenoxy)propionamide and 2.5 parts of triethylamine in 43.2 parts of methylene chloride at 0°C. is added 2.0 parts of propionyl chloride. The reaction mixture is stirred for 30 minutes and allowed to warm to room temperature and washed with ice water. The methylene chloride layer is dried over anhydrous sodium sulfate and then the solvent is removed. The crude product is chromatographed on a silica gel column and eluted with benzene:5% ethyl acetate solution. This procedure provided a fraction, which is N-propionyl-N-benzyloxy-2-methyl-2-(4-chlorophenoxy)propionamide. This compound has the following structural formula

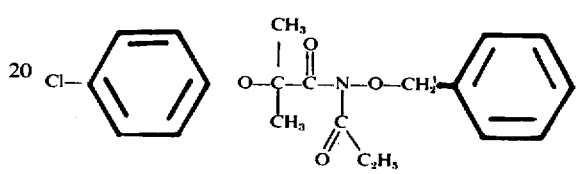

EXAMPLE 11

Following the procedure set out in Example 1, 7.0 parts of 2-(4-chlorophenoxy)-2-methyl propionyl chloride is reacted with 6.3 parts of 4-ethoxybenzyloxyamine in 63 parts of 1.0N sodium hydroxide solution to provide N-4-methoxybenzyloxy-2-methyl-2-(4-chlorophenoxy)propionamide. This compound has the following structural formula

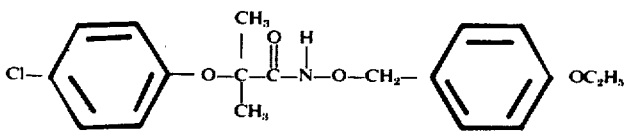

What is claimed is:
1. A compound of the formula

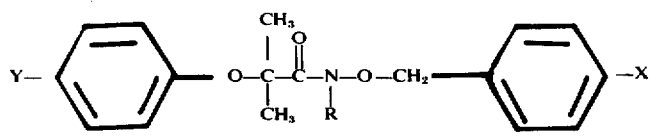

wherein X is hydrogen, (lower alkoxy) containing 1–7 carbon atoms, halo, or phenyl; Y is halo; and R is hydrogen, (lower alkoxy)carbonyl, (lower alkanoyl) containing 1–7 carbon atoms or benzoyl.

2. As in claim 1, a compound of the formula

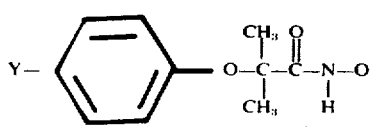

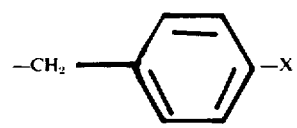

wherein X is hydrogen, lower alkoxy containing 1–7 carbon atoms, halo or phenyl and Y is halo.

3. As in claim 1, the compound which is N-benzyloxy-2-methyl-2-(4-chlorophenoxy)propionamide.

4. As in claim 1, the compound which is N-4-chlorobenzyloxy-2-methyl-2-(4-chlorophenoxy)propionamide.

5. As in claim 1, the compound which is N-4-methoxybenzyloxy-2-methyl-2-(4-chlorophenoxy)propionamide.

6. As in claim 1, the compound which is N-4-phenylbenzyloxy-2-methyl-2-(4-chlorophenoxy)propionamide.

7. As in claim 1, the compound which is N-ethoxycarbonyl-N-benzyloxy-2-methyl-2-(4-chlorophenoxy)propionamide.

8. As in claim 1, the compound which is N-acetyl-N-benzyloxy-2-methyl-2-(4-chlorophenoxy)propionamide.

9. As in claim 1, the compound which is N-benzoyl-N-benzyloxy-2-methyl-2-(4-chlorophenoxy)propionamide.

* * * * *

UNITED STATES PATENT OFFICE
CERTIFICATE OF CORRECTION

PATENT NO. : 3,911,007
DATED : Oct. 7, 1975
INVENTOR(S) : William K. Sprenger

It is certified that error appears in the above--identified patent and that said Letters Patent are hereby corrected as shown below:

Abstract formula,

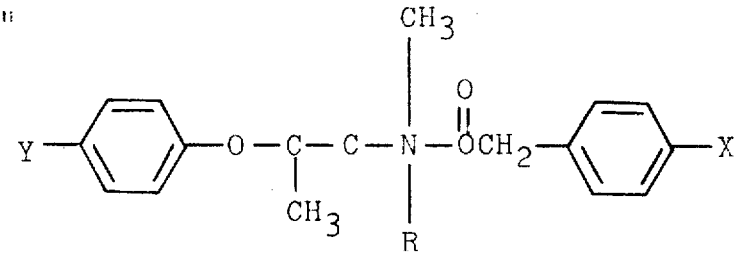

should read

-- 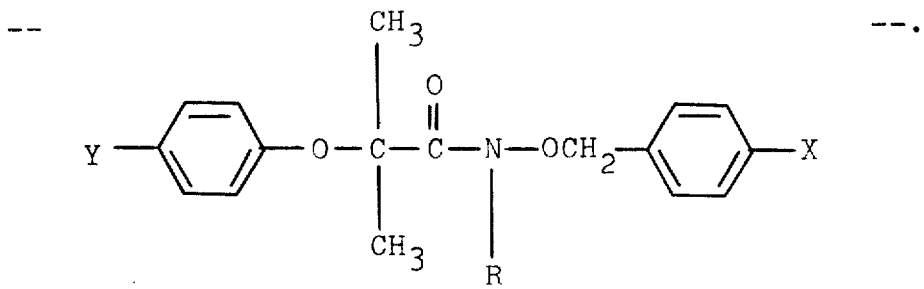 --.

Column 2, line 18, "hypolipenic" should read -- hypolipemic --.

Column 4, line 19, "The following" should read -- Following the --.

Signed and Sealed this twenty-fourth Day of February 1976

[SEAL]

Attest:

RUTH C. MASON
Attesting Officer

C. MARSHALL DANN
Commissioner of Patents and Trademarks